(12) United States Patent
Bradley et al.

(10) Patent No.: US 12,321,869 B2
(45) Date of Patent: Jun. 3, 2025

(54) CONSTRUCTING A STATISTICAL MODEL AND EVALUATING MODEL PERFORMANCE

(71) Applicant: Cambridge Mobile Telematics Inc., Cambridge, MA (US)

(72) Inventors: William Francis Bradley, Arlington, MA (US); Katherine Esther Dalis, Saint Simons Island, GA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 1025 days.

(21) Appl. No.: 17/163,229

(22) Filed: Jan. 29, 2021

(65) Prior Publication Data
US 2022/0245492 A1    Aug. 4, 2022

(51) Int. Cl.
| | | |
|---|---|---|
| *G06F 17/00* | (2019.01) | |
| *G06F 16/901* | (2019.01) | |
| *G06F 18/21* | (2023.01) | |
| *G06N 7/01* | (2023.01) | |
| *G06N 20/20* | (2019.01) | |
| *G06Q 10/0635* | (2023.01) | |
| *G06Q 40/08* | (2012.01) | |
| *G06V 10/75* | (2022.01) | |

(52) U.S. Cl.
CPC .......... *G06N 7/01* (2023.01); *G06F 16/9024* (2019.01); *G06F 18/2163* (2023.01); *G06F 18/217* (2023.01); *G06N 20/20* (2019.01); *G06Q 10/0635* (2013.01); *G06Q 40/08* (2013.01); *G06V 10/751* (2022.01)

(58) Field of Classification Search
CPC .......... G06N 7/01; G06N 20/20; G06N 20/00; G06F 16/9024; G06F 18/2163; G06F 18/217; G06F 18/214; G06Q 10/0635; G06Q 40/08; G06V 10/751
See application file for complete search history.

(56) References Cited

U.S. PATENT DOCUMENTS

| | | |
|---|---|---|
| 7,480,640 B1 | 1/2009 | Elad et al. |
| 9,228,836 B2 | 1/2016 | Girod et al. |
| (Continued) | | |

OTHER PUBLICATIONS

PCT International Search Report and Written Opinion in International Appln. No. PCT/US2022/014276, dated Jun. 10, 2022, 19 pages.

*Primary Examiner* — Greta L Robinson
(74) *Attorney, Agent, or Firm* — Kilpatrick Townsend & Stockton LLP

(57) ABSTRACT

A method for constructing and evaluating a statistical model includes receiving, by a data processing system, telematics data and insurance claims data for a population of drivers. A training dataset is generated based on the telematics data that includes values for a proxy variable derived from the telematics data, and values for one or more features derived from the telematics data. A testing dataset is generate based on the telematics data and the claims data that includes values for a target variable derived from the claims data, and values for the one or more features derived from the telematics data. A statistical model is generated using the training dataset, the statistical model configured to predict values of the proxy variable from values of the one or more features. The statistical model is validated using the testing dataset.

10 Claims, 11 Drawing Sheets

(56) References Cited

U.S. PATENT DOCUMENTS

| | | | |
|---|---|---|---|
| 9,311,676 B2 * | 4/2016 | Helitzer | G16Z 99/00 |
| 9,846,979 B1 * | 12/2017 | Sainaney | G07C 5/0808 |
| 9,881,342 B2 * | 1/2018 | Helitzer | G16Z 99/00 |
| 10,246,037 B1 | 4/2019 | Shea et al. | |
| 2007/0135938 A1 | 6/2007 | Subbu et al. | |
| 2014/0046682 A1 * | 2/2014 | Soto | G16H 50/30 |
| | | | 705/2 |
| 2014/0046705 A1 | 2/2014 | McLaughlin et al. | |
| 2015/0312655 A1 | 10/2015 | Balakrishnan et al. | |
| 2015/0363838 A1 | 12/2015 | Ramanuja et al. | |
| 2018/0364979 A1 | 12/2018 | Guttman et al. | |
| 2019/0340518 A1 | 11/2019 | Merrill et al. | |
| 2020/0143922 A1 | 5/2020 | Chekroud et al. | |
| 2020/0364953 A1 | 11/2020 | Simoudis | |

* cited by examiner

CONSTRUCTING A STATISTICAL MODEL AND EVALUATING MODEL PERFORMANCE

TECHNICAL FIELD

This disclosure relates generally to techniques for constructing and evaluating statistical models.

BACKGROUND

A statistical model is a mathematical model that embodies a set of assumptions regarding the generation of observed data. Through these assumptions, a statistical model can be used to predict the probability of a particular outcome for a given observation (or set of observations). Due to their predictive power, statistical models have a variety of applications in data analytics. For example, in the automotive insurance industry, statistical models are used to predict the risk posed by a driver in order to determine the price for an automotive insurance policy for a driver.

SUMMARY

In general, in a first aspect, a method includes: receiving, by at least one processor, telematics data and insurance claims data for a population of drivers; generating, by the at least one processor, a training dataset based on the telematics data, the training dataset including: values for a proxy variable derived from the telematics data, and values for one or more features derived from the telematics data for predicting the proxy variable; generating, by the at least one processor, a testing dataset based on the telematics data and the claims data, the testing dataset including: values for a target variable derived from the claims data, and values for the one or more features derived from the telematics data; generating, by the at least one processor, a statistical model using the training dataset, the statistical model configured to predict values of the proxy variable from values of the one or more features; and validating, by the at least one processor, the statistical model using the testing dataset.

In general, in a second aspect combinable with the first aspect, validating the statistical model using the testing dataset includes: applying the values for the one or more features included in the testing dataset to the statistical model to determine values for the proxy variable for each driver in the population of drivers; determining a distribution of the values for the proxy variable for each driver in the population of drivers; and mapping the values for the target variable in the second dataset to the distribution.

In general, in a third aspect combinable with the first or second aspects, validating the statistical model using the testing dataset includes generating a lift chart, computing a lift statistic, or computing an area under a receiver operator characteristic (ROC) curve.

In general, in a fourth aspect combinable with any of the first through third aspects, the values for the target variable included in the testing dataset include a number of insurance claims for a particular exposure period or a cost of insurance claims for a particular exposure period.

In general, in a fifth aspect combinable with any of the first through fourth aspects, the method is carried out in a first computing instance, the method further including, in a second computing instance: resampling the training dataset with replacement to produce a resampled training dataset, the resampled training dataset including values for the proxy variable and values for the one or more features; resampling the testing dataset with replacement to produce a resampled testing dataset, the resampled testing dataset including values for the target variable and values for the one or more features; generating a second statistical model using the resampled training dataset; and evaluating the second statistical model using the resampled testing dataset, including: comparing an output of the second statistical model with an output of the first statistical model; and determining a confidence interval for the output of the first statistical model based at least in part on the comparison.

In general, in a sixth aspect combinable with any of the first through fifth aspects, at least a portion of the telematics data is captured by a telematics device or mobile device disposed in a vehicle of a driver in the population of drivers.

In general, in a seventh aspect, a method includes: receiving, by at least one processor, telematics data and insurance claims data for a population of drivers; deriving, by the at least one processor, one or more features from the telematics data; identifying, by the at least one processor, a proxy variable from the one or more features, the values of the proxy variable being indicative of driving risk; generating, by the at least one processor, a training dataset with columns representing the one or more features and the proxy variable, and rows representing values for the one or more features and the proxy variable for each driver in the population of drivers; performing, by the at least one processor, regression analysis on the training dataset to produce a statistical model that relates the one or more features to the proxy variable; and evaluating, by the at least one processor, the statistical model by: determining, based on the model, a distribution of driving risk for the population of drivers, and mapping the claims data to the distribution to determine a relative risk of each driver in the population of drivers.

In general, in an eighth aspect, a method includes: accessing, from a data repository, telematics data with a plurality of fields, each field including one or more values representing an occurrence pertaining a vehicle; parsing, by a data processing system, fields in the telematics data to identify one or more specified fields and one or more corresponding values; generating a dataset with input values and output values, with the input values being values from specified fields in the telematics data, with the output values being other values from other fields in the telematics data, with the output values representing a proxy for an insurance claim submission; training a model to predict an occurrence of an insurance claim submission by performing one more regressions on the input and output values in the dataset; accessing, from a data repository, claims data representing insurance claim submissions; validating the model by comparing the claims data with an output of the model, in which the model is determined to be validated when an error between the claims data and the output satisfies a threshold.

In general, in a ninth aspect, a method includes: receiving, by at least one processor, one or more parameters for a computational experiment, the one or more parameters including one or more features and one or more datasets for generating a statistical model; generating, by the at least one processor, one or more sub-experiments based on the computational experiment, each sub-experiment including an indication of a particular set of the one or more parameters to be applied in the sub-experiment; generating, by the at least one processor, a queue with each of the one or more sub-experiments; generating, by the at least one processor, one or more computing instances configured to: receive a sub-experiment from the queue; generate a training dataset and a testing dataset by resampling the one or more datasets with replacement; generate the statistical model with the training dataset; validate the statistical model with the testing dataset; store one or more outputs of the validation in a storage system; aggregating the one or more outputs of the validation stored in the storage system to produce an aggregated output for the computational experiment; and processing the aggregated output to generate one or more performance metrics for the statistical model.

In general, in a tenth aspect combinable with the ninth aspect, the one or more parameters include a specification of features from the one or more features used for prediction, a specification of a target variable from the one or more features, a specification of a proxy variable from the one or more features, or a type of model for generating the statistical model.

In general, in an eleventh aspect combinable with the ninth or tenth aspects, each instance includes multiple processing pipelines, and each instance receives a sub-experiment for each available pipeline of the multiple processing pipelines.

In general, in a twelfth aspect combinable with any of the ninth through eleventh aspects, each of the one or more computing instances is configured to: determine whether there are any remaining sub-experiments in the queue; and terminate in response to a determination that there are no remaining sub-experiments in the queue.

In general, in a thirteenth aspect combinable with any of the ninth through twelfth aspects, the method includes processing the aggregated output to generate a confidence interval for at least one of the one or more performance metrics.

In general, in a fourteenth aspect, a method includes: receiving, by at least one processor, a specification of a risk function; receiving, by the at least one processor, a request to evaluate the risk function, the request including an indication of a particular set of data to evaluate the risk function on and an indication of one or more performance metrics to generate through the evaluation; partitioning, by the at least one processor, the particular set of data into one or more data portions; instantiating, by the at least one processor, one or more computing instances configured to: receive the risk function and one of the one or more data portions; process the risk function with the data portion to produce one or more risk points; and store the one or more risk points in a storage system; aggregating, by the at least one processor, the one or more risk points stored in the storage system to produce an aggregated output; and processing, by the at least one processor, the aggregated output to determine the one or more performance metrics for the risk function.

In general, in a fifteenth aspect combinable with the fourteenth aspect, the specification of the risk function includes an indication of one or more parameters for the risk function.

In general, in a sixteenth aspect combinable with the fourteenth or fifteenth aspects, the one or more computing instances are configured to iterate each of the one or more parameters to produce one or more risk points for each iteration of the one or more parameters.

In general, in a seventeenth aspect combinable with any of the fourteenth through sixteenth aspects, the one or more computing instances are configured to compute a gradient of each of the one or more parameters with respect to the risk function.

In general, in an eighteenth aspect combinable with any of the fourteenth through seventeenth aspects, each of the one or more computing instances is configured to: determine whether there are any remaining data portions; and terminate in response to a determination that there are no remaining data portions.

In general, in a nineteenth aspect, a method includes: receiving, by at least one processor, a specification of one or more transformations that transform a set of input files into a set of output files; generating, by the at least one processor, a directed graph describing relationships between the set of input files and the set of output files based on the one or more transformations; sorting, by the at least one processor, the directed graph to determine an order in which the transformations are applied; computing, by the at least one processor, a cryptographic hash for each input file in the set of input files; for each of the one or more transformations: determining an input of the transformation based on the order; computing a hash of the transformation and the input to the transformation; comparing the hash of the transformation and the input to the transformation with a hash of a subsequent transformation stored in a storage system; storing the hash of the transformation and the input to the transformation in a storage system when the hash of the transformation and the input to the transformation match the hash of the subsequent transformation; and applying the transformation to the input and computing a hash of the output and storing the hash of the input to the transformation, the transformation, and the output in a storage system when the hash of the transformation and the input to the transformation match the hash of the subsequent transformation; and computing, by the at least one data processing system, a final hash of all of the hashes stored in the storage system.

In general, in a twentieth aspect combinable with the nineteenth aspect, the directed graph is a directed acyclic graph.

In general, in a twenty-first aspect combinable with the nineteenth or twentieth aspects, the order is a topological order consistent with relationships between the set of input files and the set of output files.

In general, the twenty-second aspect combinable with any of the nineteenth through twenty-first aspects, the method includes: tracking, by the at least one processor, a chain of hashes; and generating, by the at least one processor, a record with the change of hashes.

In general, in a twenty-third aspect combinable with any of the nineteenth through twenty-second aspects, the method includes storing the record in metadata for each output file in the set of output files.

In general, in a twenty-fourth aspect, a system includes one or more processors configured to perform operations according to the method of any of the first through twenty-third aspects.

In general, in a twenty-fifth aspect, a non-transitory computer-readable medium includes instructions which, when executed by one or more processors, cause the one or more processors to perform operations according to any of the first through twenty-third aspects.

The details of one or more implementations are set forth in the accompanying drawings and the description below. The techniques described here can be implemented by one or more systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

In order to appropriately allocate risk, analysts in the automotive insurance industry construct statistical models to predict driving risk based on observed features of each driver. To construct such a model, the analyst first partitions a set of observed features and corresponding claims data (representing driving risk) for a population of drivers into two disjoint portions: a training dataset and a test dataset (or hold-out dataset). A model, such as regression model, is fit to the training data, and the test dataset is used to evaluate the performance of the model. If performance of the model is validated, an expected claims rate (or claims cost) can be predicted for any given driver.

However, claims data can be scarce, and sufficient claims data may not be available to effectively train or validate the statistical model. In addition, claims data may not be the best target variable for training the statistical model in some instances, making consumption of a portion of the claims data for training purposes an inefficient use of resources. Even when sufficient claims data is available, constructing and evaluating a statistical model is time and resource intensive, making it difficult for an analyst to meaningfully explore the performance of new models and features.

The techniques described here improve the construction and evaluation of statistical models, such as models for predicting driving risk. In some examples, an interactive user interface is provided that enables a user (e.g., an analyst) to specify various parameters for building a model, such as the features used for prediction and the target variable used for training and/or testing, among others. If the user is unsure of which features to select for a particular model (or would simply like to explore new features), feature learning processes can be employed which consume large amounts of low-level data to develop new features in a short amount of time. In addition, to avoid the dilemma posed by the trade-off between the size of the training and test datasets, the techniques described here enable a user to model through proxy variables.

Using the information specified by the user, a model is quickly and efficiently generated and validated, and performance metrics are presented to the user. In some examples, highly-parallelized bootstrapping techniques are used to quickly generate confidence intervals for model outputs in order to facilitate statistically-meaningful comparisons among models. Additional techniques described here also assist with record-keeping and regulatory compliance through a fully-automated system that preserves model data pipelines in a reproducible format.

Figure 1:
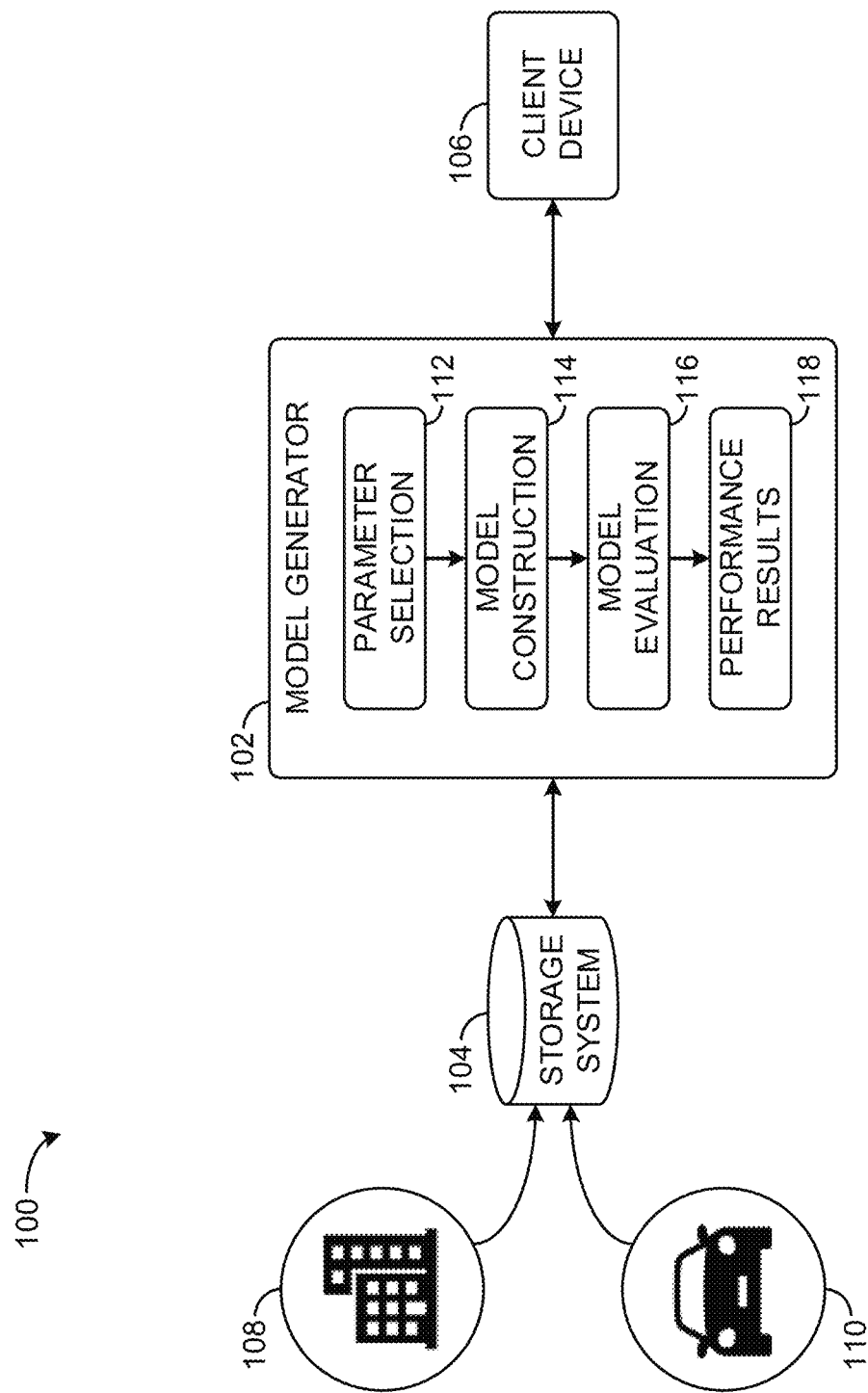
FIG. 1 illustrates an example system for constructing and evaluating a statistical model.

FIG. 1 illustrates an example system 100 for constructing and evaluating a statistical model. For example, the system 100 can be configured to construct and evaluate a statistical model for predicting driving risk given a set of observed features for a driver. In this context, risk represents the expected number of claims by the driver during a particular exposure period (e.g., a frequency model), or the expected cost of claims by the driver during a particular exposure period (e.g., a loss cost model). To facilitate understanding, the following discussion uses the example of a statistical model designed to predict risk of automotive insurance claims. However, the techniques described herein are not limited to such models and can be used to construct and evaluate other models in some implementations.

As shown in FIG. 1, the system 100 includes a model generator 102, a storage system 104, and a client device 106. The storage system 104 includes one or more computer-readable storage mediums configured to receive and store data for constructing and evaluating a statistical model, such as insurance claims data and observed feature data, among other information. In this example, insurance claims data refers to information about the existence, cost, or other aspects of insurance claims. Insurance claims data can also include information regarding a driver's exposure (e.g., information about the amount of time (or distance) for which the driver is insured, or for which the observed feature data is collected). In some examples, the storage system 104 receives the claims data from an insurance company 108 (e.g., over one or more wired or wireless networks).

Observed feature data refers to information about an insured driver (e.g., age, gender, credit, zip code, etc.), or about the insured driver's vehicle (e.g., make, model, year, value, etc.). In some examples, the observed feature data includes telematics data captured during one or more trips (e.g., an instance of travel between a starting location and an ending location) of an insured driver's vehicle 110. For example, the vehicle 110 can include one or more sensors (e.g., accelerometers, gyroscopes, global navigation satellite systems (GNSS), image sensors, audio sensors, etc.) configured to collect telematics data for transmission to the storage system 104. In some examples, the sensors are included in a telematics device that is installed in or brought into the vehicle. Such a telematics device can be an original equipment manufacturer (OEM) telematics device installed during manufacture of the vehicle 110, a telematics device connected to, for example, an on-board diagnostics (OBD) port of the vehicle 110, or a mobile device, such as a smart phone, tablet, or wearable device, that is brought into the vehicle 110. In some examples, the telematics device is a tag device that is placed or affixed in (but not electrically connected to) the vehicle 110, such as tag device of the kind described in U.S. patent application Ser. No. 14/529,812, titled "System and Method of Obtaining Vehicle Telematics data," the entire contents of which is incorporated herein by reference. The telematics data may be further processed, possible in conjunction with additional data, to provide further features. An example is found in U.S. patent application Ser. No. 13/832,456, titled "Inference of vehicular trajectory characteristics with personal mobile devices," the entire contents of which is incorporated herein by reference. In some examples, the claims data and observed feature data are linked to one another through, for example, a unique identifier for the insured.

In operation, the model generator 102 receives some or all of the claims data and observed feature data from the storage system 104. In some examples, the model generator 102 is realized by a computer system, such as the computer system 1000 described with reference to FIG. 10. The model generator 102 then uses one or more processors to process the received data in order to construct and evaluate a statistical model. Initially, at 112, the model generator 102 selects parameters for constructing and evaluating the model. In some examples, parameter selection 112 includes selection and augmentation of the features used for prediction, the target feature used for validation, the target variable used for training and/or testing (which may be distinct per the proxy target techniques described herein), the type of data used for training and/or testing, or the type of model being fit (e.g., Poisson, Tweedie, negative binomial, etc.), or combinations of them, among others. Such a selection can be made automatically by the model generator 102 based on known or observed rules or constraints, or by a user of the client device 106, or by the user in conjunction with the model generator 102. For example, the model generator 102 can be configured to cause the client device 106 to display a graphical user interface (GUI) that allows the user of the client device 106 to view and select some or all of the parameters for model construction and evaluation. In some examples, the client device 106 is a computer system (e.g., a computer, laptop, smart phone, tablet, etc.), such as the computer system 1000 described with reference to FIG. 10, operated by a user (e.g., an analyst). In some examples, parameter selection 112 includes feature selection and/or feature extraction as described below in the "Feature Learning at Scale" subsection.

Once parameters and other features of the statistical model have been selected, the model generator 102 proceeds with constructing 114 the model. In general, model construction 114 includes fitting the selected model type to the training dataset (e.g., by finding optimal parameters for the model that best match the model to the training dataset). In some examples, the training dataset includes a portion of the observed features data and the corresponding claims data that have been partitioned for training. In other examples, the training dataset includes a portion of the observed features data and a proxy target variable separate from the claims data as described below in the "Modeling through Proxy Variables" subsection.

After the model has been fit to the training dataset, the model is evaluated 116 on the test dataset. In general, model evaluation 116 includes validating whether the model's predictive performance on the training dataset translates to the new test dataset (e.g., by generating performance metrics for the model as applied to the test dataset, comparing the prediction error of the model for each dataset, etc.). In some examples, the test dataset includes the portion of the observed features data and the corresponding claims data that was held-out from training the model. In other examples, such as when a proxy target variable is used for training the model, the test dataset includes all of the claims data and the related observed features data.

The final predictive model can be constructed by using the model directly, or by using the model indirectly to infer risk from the test dataset. For example, if the model produces an estimate of risk, it can be used to directly predict the risk posed by a driver. Using the model directly may be appropriate when the training dataset is large. However, if the size of the training dataset is small, then estimates may be overfit leading to poor model performance. In particular, the model may exaggerate surcharges and discounts. On the other hand, the model can be used indirectly to provide an ordering of drivers from safest to riskiest, which can then be related to the relative risk from the held-out test data. Statistically speaking, this operation can be thought of as using a forward and inverse probability transform to map the range of the predictions to the distribution of the held out data. Practically speaking, this amounts to constructing a lift chart using model for quantiles, but using the frequency counts or loss cost from the test data to estimate the relative risk. The y-axis of each point on the lift curve corresponds to the discount or surcharge to offer that fraction of the population.

In some examples, model evaluation 116 includes determining various performance metrics for the model, such as the lift, area under the curve (AUC), among others. In some examples, confidence intervals are provided for these statistics. For example, suppose that a risk model has been produced for a set of drivers. For each driver, the model produces a prediction for the expected number of claims that the driver will generate as a function of a set of observed features about the driver. By analyzing each driver in turn, the model can be used to produce predictions for an entire population of drivers. Next, the drivers are split into quantile ranges (e.g., by sorting the drivers by increasing risk probability and then splitting this ordered list into equal-sized ranges based on quantiles, with optional weighting to account for different exposure levels among drivers). The number of claims for each quantile range are then aggregated. From this information, the frequency lift, or frequency lift statistic, can be determined as the ratio between the number of claims corresponding to the most risky quantile range and the number of claims in the least risky quantile range. If the total claim cost is aggregated per quantile instead of the total number of claims, the loss cost lift can be determined analogously. In either case, a larger lift statistic corresponds to a more predictive model.

Another performance metric that can be determined for the model is AUC, where the curve is the receiver operating characteristic (ROC) curve. In some examples, confidence intervals are determined for the model predictions as described below in the "Bootstrapping at Scale" subsection.

Figure 2A:
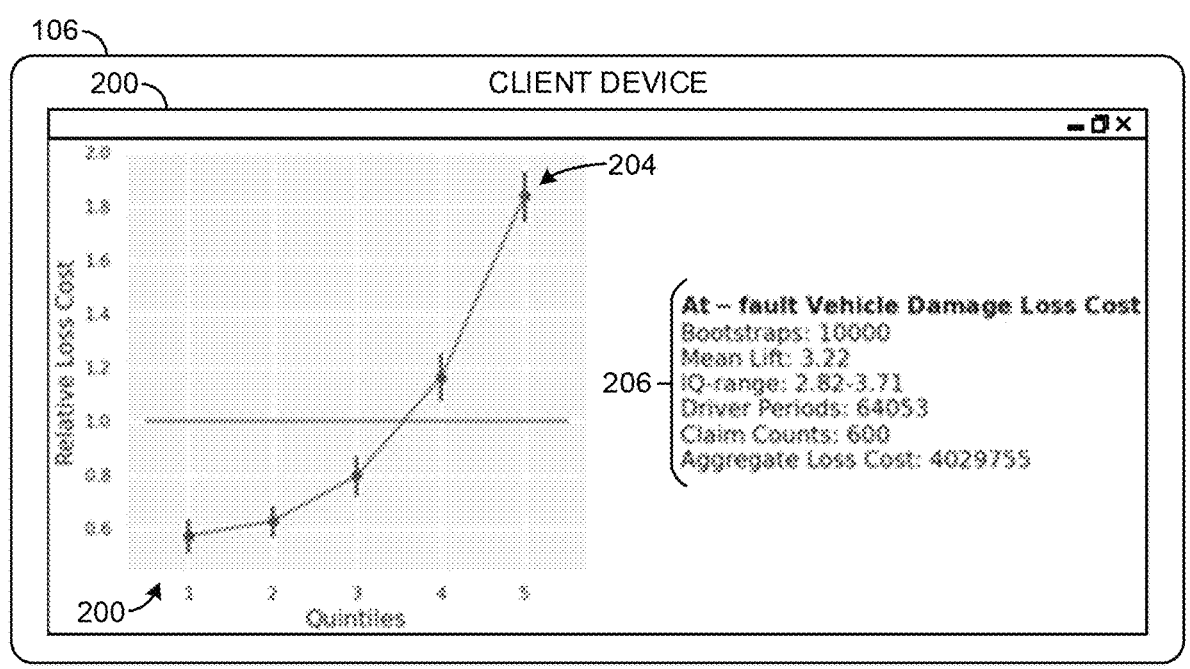
FIG. 2A illustrates an example user interface with a lost cost lift chart.
Figure 2B:
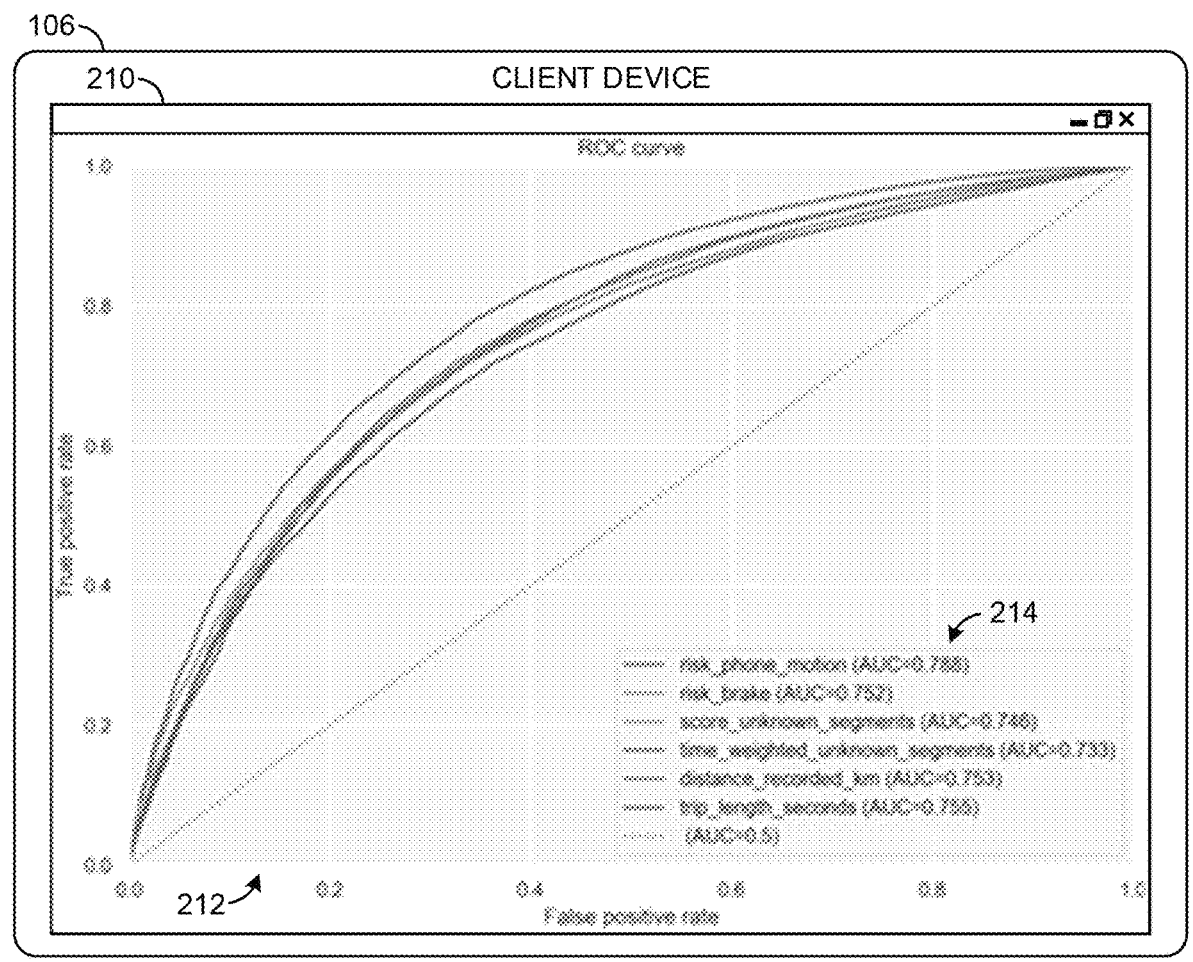
FIG. 2B illustrates an example user interface with a receiver operating characteristic (ROC) chart.

In some examples, the model generator 102 generates performance results 118 for the model based on the evaluation. These performance results include, for example, human-readable text and/or human-viewable figures describing the performance of the model, such as lift charts, lift statistics, ROC charts, AUC measurements, and confidence intervals for model predictions, among other information. In some examples, the model generator 102 is configured to provide or otherwise display the performance results at the client device 106 for analysis by a user (e.g., by causing the client device 106 to display a GUI with the performance results). For instance, FIG. 2A shows an example user interface 200 with a lost cost lift chart 202 that is displayed on the client device 106. In this example, the lift chart 202 depicts the relative lost cost lift for different quantiles of drivers, along with confidence intervals 204 for the predicted values and human-readable text 206 describing various performance metrics for the model. FIG. 2B shows an example user interface 210 with a ROC chart 212 that can be displayed on the client device 106. In this example, the ROC chart 212 includes multiple ROC curves describing the true positive rate and false positive rate for different models, as well as the AUC 214 for each model.

Through the performance results 118 provided by the model generator 102, a user of the client device 106 can quickly and easily evaluate the performance of a particular model and compare the relative performance of the model with other models. If the user is satisfied with the performance of the model, the user can cause the model generator 102 to store the model and its underlying data pipeline for record-keeping as described below in the "Reproducible Data Pipelines" subsection. At this point, the user can deploy the model for predicting driver risk based on new observations. The model can also be updated (and the modifications evaluated) to account for new training data (e.g., new observations for existing features) or new testing data (e.g., new claims data), or modified to, for example, add, remove, or otherwise change the features used for prediction.

Modeling Through Proxy Variables:

When training and validating a statistical model, it is desirable to use training and test datasets that are as large as possible in order to maximize the performance of the model and the reliability of the validation. However, in many instances, the data used to train and validate a statistical model is of fixed size. For example, in the context of automotive insurance, the claims data used to train and validate a risk model is limited by the number of available claims. Due to the fixed size of this data, there is an inherent tension between the size of the training and test datasets: the larger the training dataset, the smaller the test dataset (and vice versa).

However, this trade-off only exists if the test dataset is trained on the same target variable as the training dataset. The term "target variable" (also referred to as the endogenous, outcome, criterion, or regressand variable) refers to the variable that the model is attempting to predict, such as the number of claims or the total cost of claims when predicting driving risk. If there is an independent proxy target variable (e.g., on the same set of drivers, or perhaps on a different set of drivers), then all of the proxy target data can be used to train the model and all of the actual target data (e.g., claims data) can be used to validate the model. The term "proxy target variable" refers to a variable that represents or correlates with the target variable that the model is attempting to predict. Because the testing process is unchanged, the model validation remains statistically valid. In fact, the validation is often more accurate than validation without a proxy target variable, because all of the actual target data has been used for validation.

A proxy target variable might appear to be the "wrong variable" for training a statistical model to predict an actual target variable. However, in some examples, a proxy target variable can perform better than the actual target variable. For example, consider the task of trying to predict a person's weight from their measured height. A collection of <height, observed weight> measurements are provided to build a model that predicts the observed weight from the height. However, assume that the person's weight is determined by an inaccurate scale that produces a noisy measurement instead of reporting the person's true weight. The height of a new person is provided, and the task is to predict the person's measured weight on the inaccurate scale.

In some examples, if model validation is unnecessary, all of the <height, observed weight> pairs can be used as a training dataset to build a predictive model of observed weight (e.g., through linear regression).

Suppose another option for training purposes is to measure each person on a more accurate scale (though the goal is still to predict the reading on the inaccurate scale). If the same scale must be used for all training measurements, it is better to use the more accurate scale (e.g., the proxy target) instead of the inaccurate scale (e.g., the actual target) in some instances. For example, assume that the model is trained on $i=1, \ldots, N=10$ people with heights $H_i$ which are uniformly distributed between [60, 72] inches. Assume further that the true weights are $W_i$, and $W_i=2H_i$. Measured weights from the inaccurate scale are $B_i=W_i+n_i^B$, with noise term $n_i^B \sim N(0, S_B^2)$, and measured weights from the accurate scale are $G_i=W_i+n_i^G$, with noise term $n_i^G \sim N(0, S_G^2)$, where $1=S_G \ll S_B=20$ (and all noise terms are independent). If a new height $H_j$ is sampled and the error between the prediction and $B_j$, then a linear regression trained on $G_i$ is about 10% more accurate (in standard deviation) than one trained on $B_i$, despite training on the "wrong" scale (e.g., the proxy target).

Accordingly, in some examples, the model generator 102 is configured to use a proxy target variable to construct a statistical model. For example, in the automotive context, the model generator 102 is configured to receive telematics data and train a model to predict driving risk using one or more proxy targets from the telematics data. These proxy targets include, but are not limited to, telematics collisions (e.g., collisions detected from the motion of the vehicle, rather than collisions detected as the result of a claim being filed), severe braking (e.g., braking greater than a particular magnitude), severe acceleration (e.g., acceleration greater than a particular magnitude), phone use while driving (e.g., concurrent motion of the vehicle and the driver's phone), or combinations of them, among other telematics-based or non-telematics-based proxy targets. Additional details regarding detection of telematics collisions are described in U.S. patent application Ser. No. 16/035,861, titled "Vehicle Telematics of Vehicle Crashes," the entire contents of which is incorporated herein by reference in its entirety.

The model generator 102 can validate a proxy target using similar techniques to those described herein for validation of an actual target (e.g., through analysis of a lift chart or computation of the AUC, among others). Because validation of the proxy target produces a relative ordering of the predicted outcome (e.g., a relative ordering of the driving risk) rather than the actual predicted value, the validation holds true even if the model is predicting a different target. The relative nature of the model predictions also means that the absolute scale of the model predictions is irrelevant. To transform the distribution of the proxy target to the distribution of the actual target, the model generator 102 can use the indirect method of producing the final predictive model as described above.

By using a proxy target variable, the model generator 102 can produce a model with improved performance relative to a model constructed using an actual target variable, as demonstrated in the above example. In addition, a proxy target variable (e.g., severe braking) can be selected that is much more common than the actual target variable (e.g., insurance claims, which are relatively rare). Not only does this improve model performance (e.g., by providing more training data, by providing training data that can better model latent risk than the actual target, etc.), but use of the proxy target for training allows all available data for the actual target (e.g., claims data) to be used for testing and validation. By maximizing the size of the test dataset, the performance of the model can be evaluated more accurately and reliably. For example, there is an actuarial standard which requires 1082 claims for validating a frequency model (see, e.g., Longley-Cook, Laurence H. "An introduction to credibility theory." Casualty Actuarial Society, 1962). If an actuary has 1082 claims for some particular type of insurance claim, then use of a proxy target makes it possible to build a credible model that would be impossible to validate through the traditional approach of splitting the data into a test and training set.

Using a proxy target variable can also reduce the time to market for a model. For example, suppose an insurance company is interested in developing a new model for predicting driving risk based on severe braking. To validate this model, the insurance company needs to collect enough data on its own population of drivers. For instance, assume the company needs to collect C claims to establish validity. If the company uses a standard 70%/30% training/test split (e.g., 70% of claims data is used for training, and the remaining 30% is used for testing), then the company needs to collect 3.3C claims to provide sufficient data for building a model and validating it. On the other hand, if the company uses a proxy target variable, then they only need to collect C claims for validation. Because claims aggregate over time, the proxy target approach speeds up the training and validation process by a factor of 3.3, thereby reducing the time to market for the new model.

In some examples, use of a proxy target variable increases model uniformity across jurisdictions. For example, automotive insurance claims are governed by various jurisdiction-specific regulations such that an event that leads to a claim in one jurisdiction may not result in a claim in another jurisdiction. As such, it can be difficult to combine claims data across jurisdictions in a coherent fashion. However, a proxy target variable (e.g., severe breaking) can be defined and measured uniformly across jurisdictions. Thus, the effective size of a uniform training set may be significantly larger when a proxy target variable is used than when an actual target variable is used.

A proxy target variable can also allow for implicit importance sampling. For example, suppose that the selected proxy target variable corresponds to more expensive claims. If a model built to predict the proxy variable is predictive, a large frequency lift statistic would result. However, because this example effectively oversamples the expensive claims, the loss cost lift statistic would be even larger than the frequency lift statistic. This benefit can be seen as a type of implicit importance sampling in which the sampling of the claim count is biased toward the claims of more interest for premium pricing.

Bootstrapping at Scale:

Suppose a model's performance is evaluated on a test dataset by producing a lift chart and corresponding lift statistic. Both the lift chart and the lift statistic are given as point estimates. However, it would be desirable to produce a confidence interval for the estimates. That way, if one model has higher lift than another, then it can be determined whether the difference in performance is statistically significant.

Figure 3:
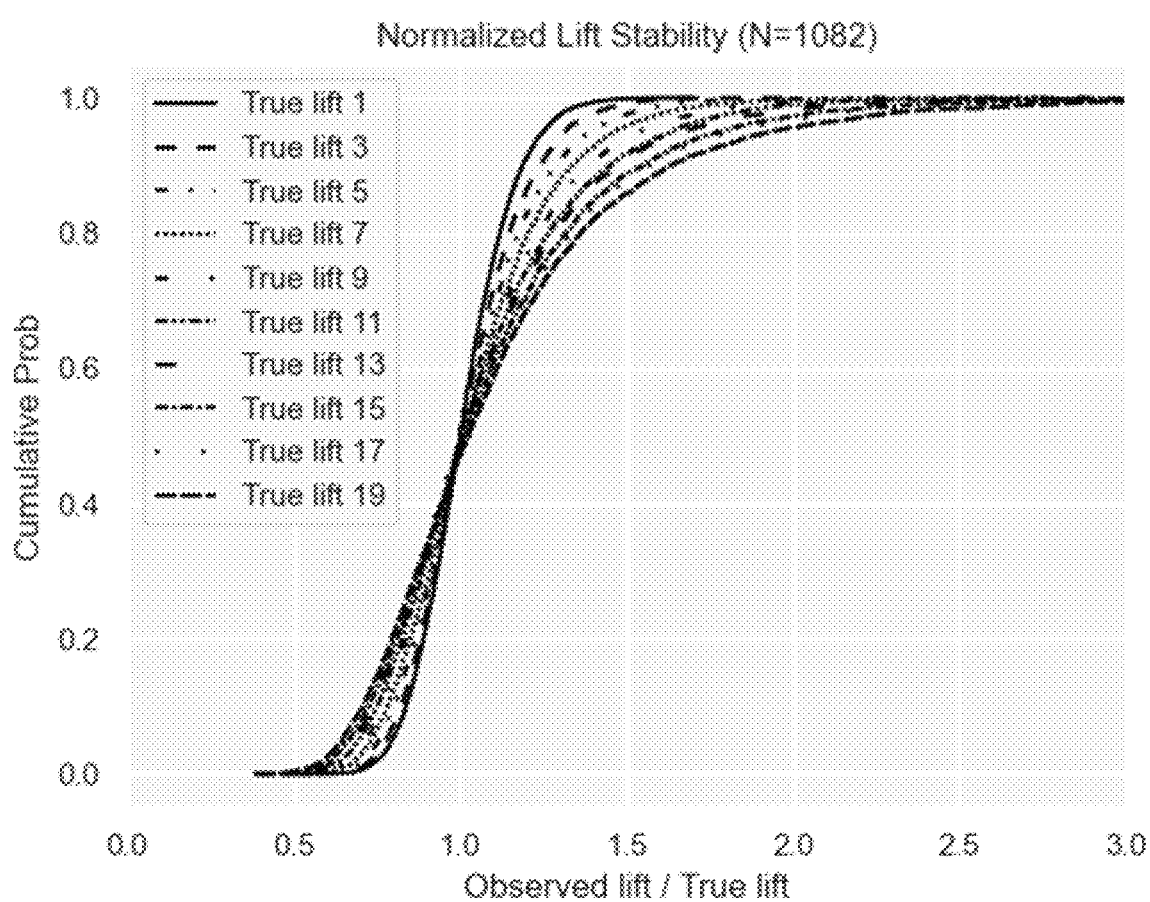
FIG. 3 illustrates an example normalized lift stability chart.

Also, as more data becomes available in a field, models typically become increasingly predictive and lift increases. For example, as smartphones have become available for collecting widespread driving data, the accuracy of automobile risk models should improve. As lift improves, the need for confidence intervals becomes greater. Consider taking a generative model with known lift and sampling many data sets, maintaining the actuarially suggested threshold of 1082 claims. For each dataset sampled by the model, some lift will be observed that may be larger or smaller than the true lift. By resampling the model, a cumulative distribution function (CDF) for the ratio of the observed lift to the true lift can be obtained for each true lift. As shown by the normalized lift stability chart 300 in FIG. 3, the higher the lift, the wider the distribution of the observed lift, and correspondingly the more important a confidence interval becomes. Note that FIG. 3 shows the relative sampling error; if the absolute error in lift is considered, the distribution of the observed lift is even wider.

In some examples, such as simple probabilistic models, it is possible to produce an analytic confidence interval in closed form. However, the complex steps involved in building an actuarial model (e.g., a generalized linear model (GLM)) make that approach impractical.

Accordingly, in some examples, the model generator 102 is configured to use bootstrapping to estimate confidence intervals even with extremely complicated models. In general, bootstrapping includes randomly sampling data with replacement and repeating the analytic steps (e.g., fitting a new model, such as a GLM, each time the data is resampled). After a threshold level of samples are generated, a confidence interval can be extracted for essentially any statistic of interest, including the values of a lift chart (e.g., for the observed lift for each quantile range) and the lift statistic itself.

Unfortunately, bootstrapping is very computationally intensive. To load data, resample it, and fit a single model to the data might take 30 seconds in a real world system. To obtain a confidence interval with a high level of accuracy, it may be necessary to repeat that process 10,000 times (e.g., to produce 10,000 bootstrap samples), resulting in 3.5 days of computation time to produce a single confidence interval. Such a delay would render the process impractical in most situations.

Figure 4:
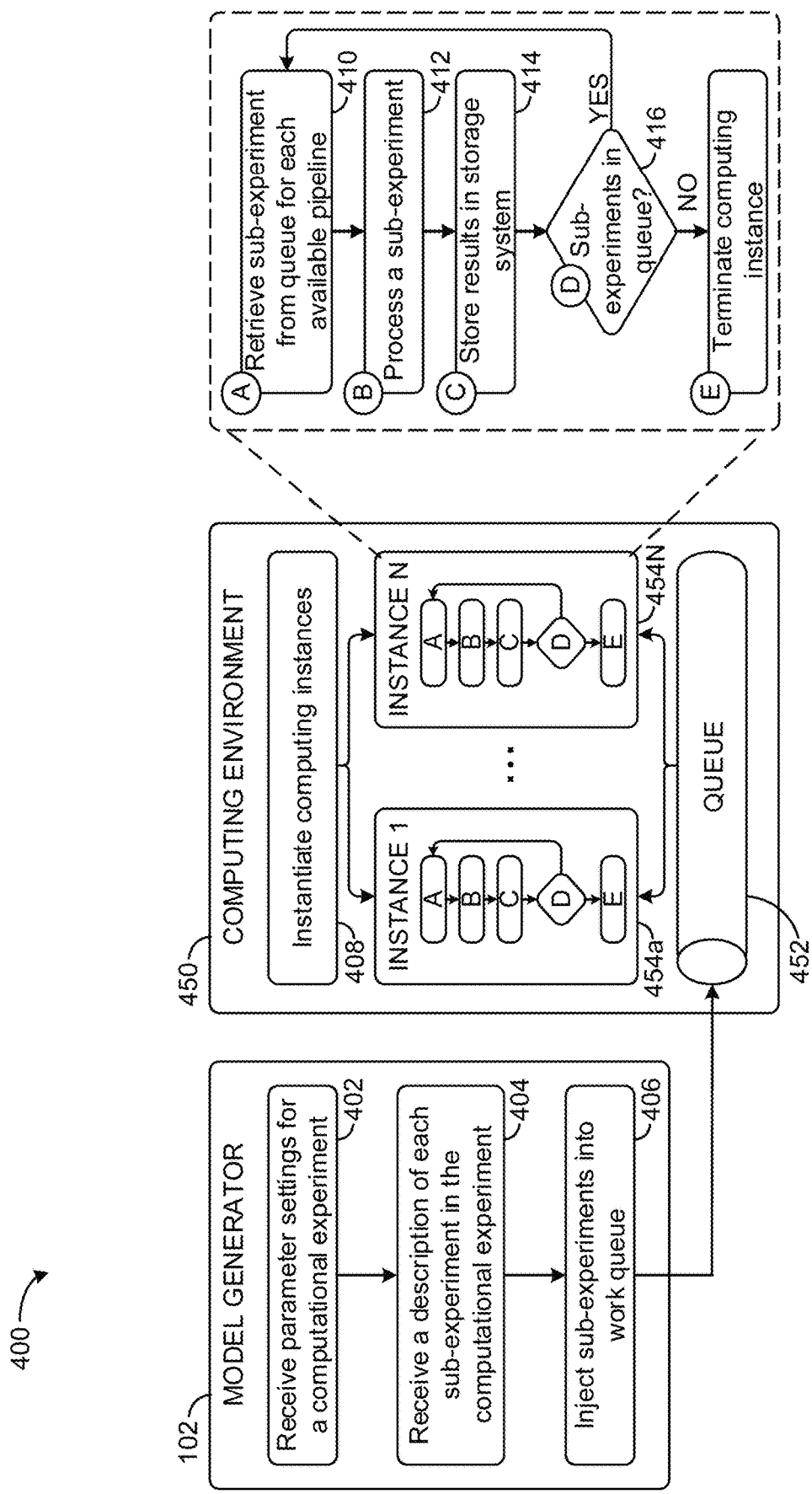
FIG. 4 illustrates an example process for generating confidence intervals.

As such, a process 400 can be used to rapidly produce confidence intervals, as shown in FIG. 4. In some examples, the process 400 can be carried out by the model generator 102 and a computing environment 450 (among other components of the system 100, such as the storage system 104 and/or the client device 106). Although shown as separate components, in some examples the model generator 102 and the computing environment 450 are a singular data processing system (or distributed data processing system).

Operations of the process 400 include receiving 402 parameters settings for a computational experiment. For example, the parameter settings can be received from a user operating the client device 106 (e.g., through input or selection of the parameter settings in a GUI displayed on the client device), automatically selected by the model generator 102 (e.g., based on known or observed rules or constraints), or a combination thereof. In this context, a computational experiment refers to a collection of sub-experiments, each of which corresponds to bootstrap resampling of data for a particular set of parameter settings, fitting a model to the data, validating the model performance on a separate set of data, collecting the results, and producing human-readable text, human-viewable figures and machine-readable data in an automated fashion. In some examples, the parameter settings received at 402 are the same or similar to the parameters selected at 112 and include, for example, features used for prediction, the target feature used for validation, the target variable used for training and/or testing (which may be distinct per the proxy target techniques described herein), the type of data used for training and/or testing, the type of model being fit (e.g., Poisson, Tweedie, negative binomial, etc.), feature selection settings, or feature extraction settings, or combinations of them, among others.

At 404, the model generator 102 receives a description of each sub-experiment in the computational experiment. The description of a sub-experiment can include, for example, a description of a particular set of parameter settings to be applied in the sub-experiment. In some examples, a user of the client device 106 uses a software library to encode, for example, JavaScript object notation (JSON) descriptions of the sub-experiments. In some examples, each sub-experiment includes evaluation of 10 bootstrap resamples of the same parameter settings, although a different number of resamples can be specified by the user.

Once the descriptions of the sub-experiments are received, the sub-experiments are injected 406 into a work queue 452 of a computing environment 450, such as a cloud computing environment. This prompts the instantiation 408 of one or more computing instances 454a, . . . , 454N (e.g., virtual machines) within the computing environment 450. Each instance then retrieves 410 a sub-experiment experiment for each available pipeline. In some examples, an instance runs as many pipelines as can be supported by the underlying computing resources, such as the core count and available memory. Once a sub-experiment is retrieved, each instance processes 412 the sub-experiment. Processing a sub-experiment includes extracting and modifying features from filtered training data through a probabilistic model, and then validating on testing data. In some examples, each operation (e.g., feature extraction, feature modification, dataset choice, data filtering, probabilistic model choice, (proxy) target variables for testing and training, etc.) is configurable by the sub-experiment.

As the sub-experiments are processed, results for each bootstrap resample are stored 414 in a storage system, such as the storage system 104 or another storage system (e.g., a cloud database, cloud storage, network attached storage, etc.). Upon completion of a sub-experiment, the instance determines 416 whether sub-experiments remain in the queue. If there are remaining sub-experiments, the instance retrieves the next available sub-experiment in the queue and repeats operations 412-416. Otherwise, if there are no remaining sub-experiments, the instance terminates 418 itself. By instantiating computing instances only when required and terminating the instances when work is complete, the process 400 increases computational efficiency and minimizes the total cost of performing experiments (especially when the process 400 is run on a commercial cloud computing environment).

Upon completion of the computational experiment and its sub-experiments, the results are combined into a single file (e.g., by the last remaining instance or a separate processor in the computing environment 450) and stored in a storage system. The results file can then be processed to produce one or more outputs, such as lift charts with lift statistics and confidence intervals. In this manner, a user is quickly provided with confidence intervals for a statistical model (among other performance data) which improves their ability to analyze the model and compare it with other models.

The bootstrapping techniques described herein also facilitate hyperparameter searching. A user (e.g., an analyst) is frequently in the situation of trying to fit multiple parameters for their features simultaneously. For example, the user may wish to simultaneously choose the best subset of features that are used to create the model, the model type, whether to use a feature directly or take its logarithm, whether to truncate extremal values of a feature to trim outliers, and, if so, to choose the threshold used for truncation.

Answering hyperparameter search problems of this sort can be slow or impossible since the dimensionality of the search space grows exponentially with the number of parameters being fit. However, instead of performing a single, highly accurate confidence interval computation (or other computation), the techniques described here can be used to perform thousands of lower-accuracy experiments. The best set of parameters can then be found quickly.

In addition, when evaluating thousands of hypotheses, it becomes increasingly likely that some non-causal hypothesis will score highly. This problem can be addressed to some extent through a modest amount of bootstrap resampling. For instance, the system might run 250 sub-experiments, resample each sub-experiment 40 times, and take the median value, which is as fast as a single 10,000 bootstrap run and is practical.

Feature Learning at Scale:

In classical actuarial risk modeling for auto insurance, a driver would be described by a handful of variables, such as age, gender, zip code, and credit score. An actuary is then left with the job of taking these variables and regressing them to estimate claims count or claims cost. Even with millions of driver policies, this process was relatively straightforward from a computational perspective.

In a modern telematics system, however, it is reasonable to collect 1000 driving variables for each second of driving. Across a scoring period of several months to a year, a typical driver can easily generate a billion variables. The traditional methods of feature development are no longer applicable.

One approach is to use some intuition to extract a simple feature from the data (e.g., "Maybe hard braking is dangerous?"), add it to the list of the other variables, and see if the predictive performance improves. This approach is dictated by the computational and statistical complexity of handling the data at full scale.

Figure 5:
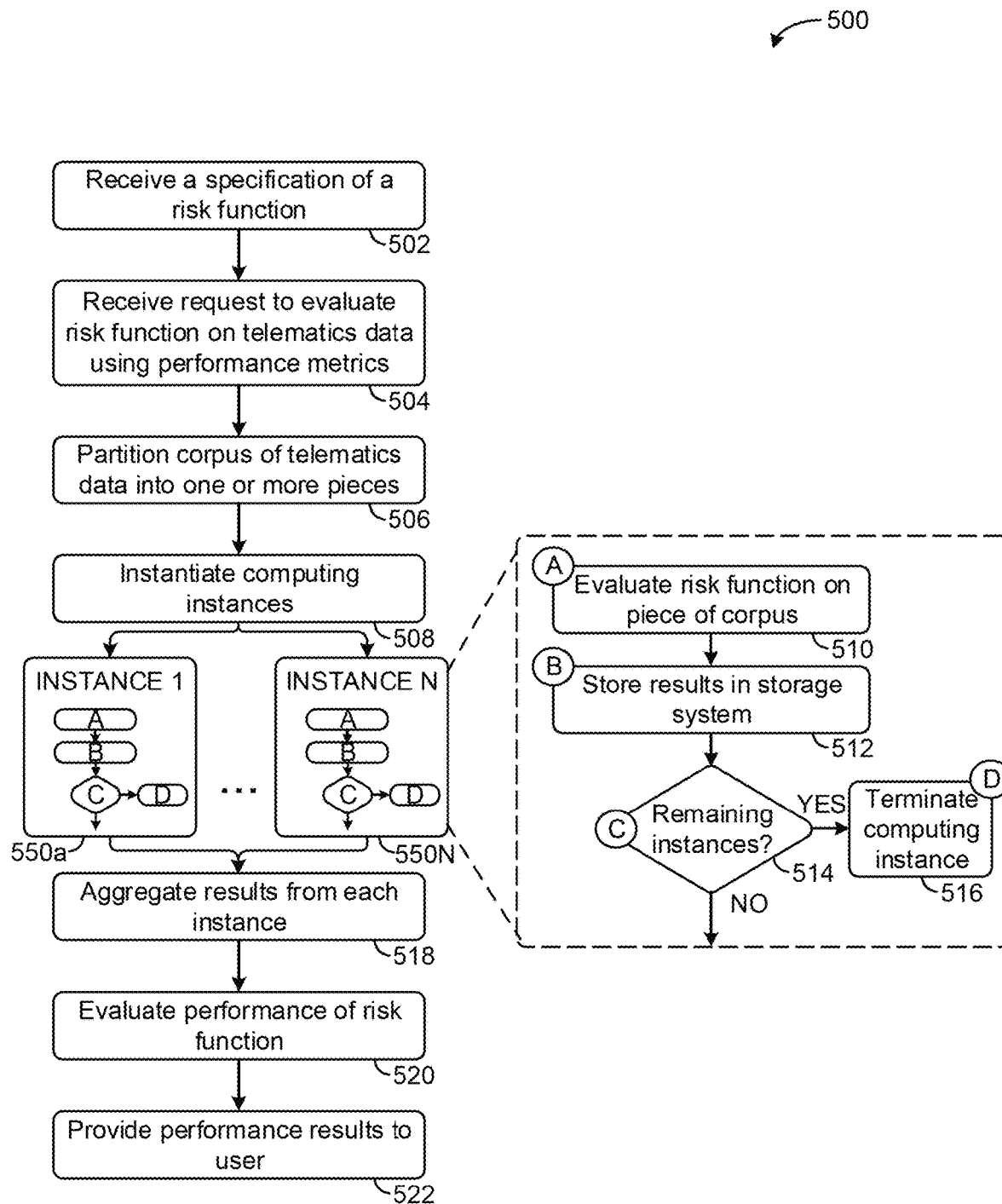
FIGS. 5 and 6 illustrate example processes for feature learning.

FIG. 5 illustrates a process 500 for feature learning in accordance with an aspect of the disclosure. The process 500 is designed to consume large amounts of low-level data to produce a standardized output in a short amount of time, thereby assisting users with developing new features for improving model performance. In some examples, the process 500 is carried out by the model generator 102 (among other components of the system 100, such as the storage system 104 and/or the client device 106). In some examples, the process 500 is carried out by a computing environment (such as the computing environment 450) alone or in combination with the model generator 102.

Operations of the process 500 include receiving 502 a specification of a risk function. In some examples, the risk function is a piece of software defined by a user (e.g., a user of the client device 106) that takes as an input the telematics data from a trip and outputs risk points. For example, the risk function can be a piece of software that counts the total number of seconds that the vehicle's speed exceeds 50 miles per hour, or that counts the number of left hand turns made during a trip, where a left hand turn is defined in some precise fashion. At 504, a request to evaluate the risk function on a specified corpus of telematics data to produce an enumerated set of performance metrics is received. In some examples, the performance metrics include lift, AUC, or a Gini index (e.g., a measure of statistical dispersion), or combinations of them, among others.

The corpus of telematics data is partitioned 506 into one or more pieces. One or more computing instances 550a, . . . , 550N (e.g., virtual machines) are instantiated 508, and each instance is passed the risk function, performance metrics, and its piece of the corpus. At 510, each computing instance evaluates the risk function on all of the telematics data in its piece of the corpus (or all of the trips in its piece of the corpus). When evaluation of the risk function is complete, the instance stores 512 the results of the evaluation (e.g., the risk points) in a storage system, such as the storage system 104 or another storage system (e.g., a cloud database, cloud storage, network attached storage, etc.).

At 514, the instance determines whether there are any remaining instances that are still evaluating the risk function. If at least one instance remains, then the instance terminates 516 itself to reduce consumption of computing resources and minimize cost. If there are no remaining instances (e.g., the instance is the last instance), then the instance aggregates 518 the risk points stored in the storage system for each instance and evaluates 520 the performance of the risk function by deriving the specified performance metrics from the aggregated results. In some examples, the risk points are aggregated and the function's performance is evaluated by another processor separate from the instances. At 522, the performance metrics are provided to the user (e.g., through a GUI displayed on the client device 106).

Figure 6:
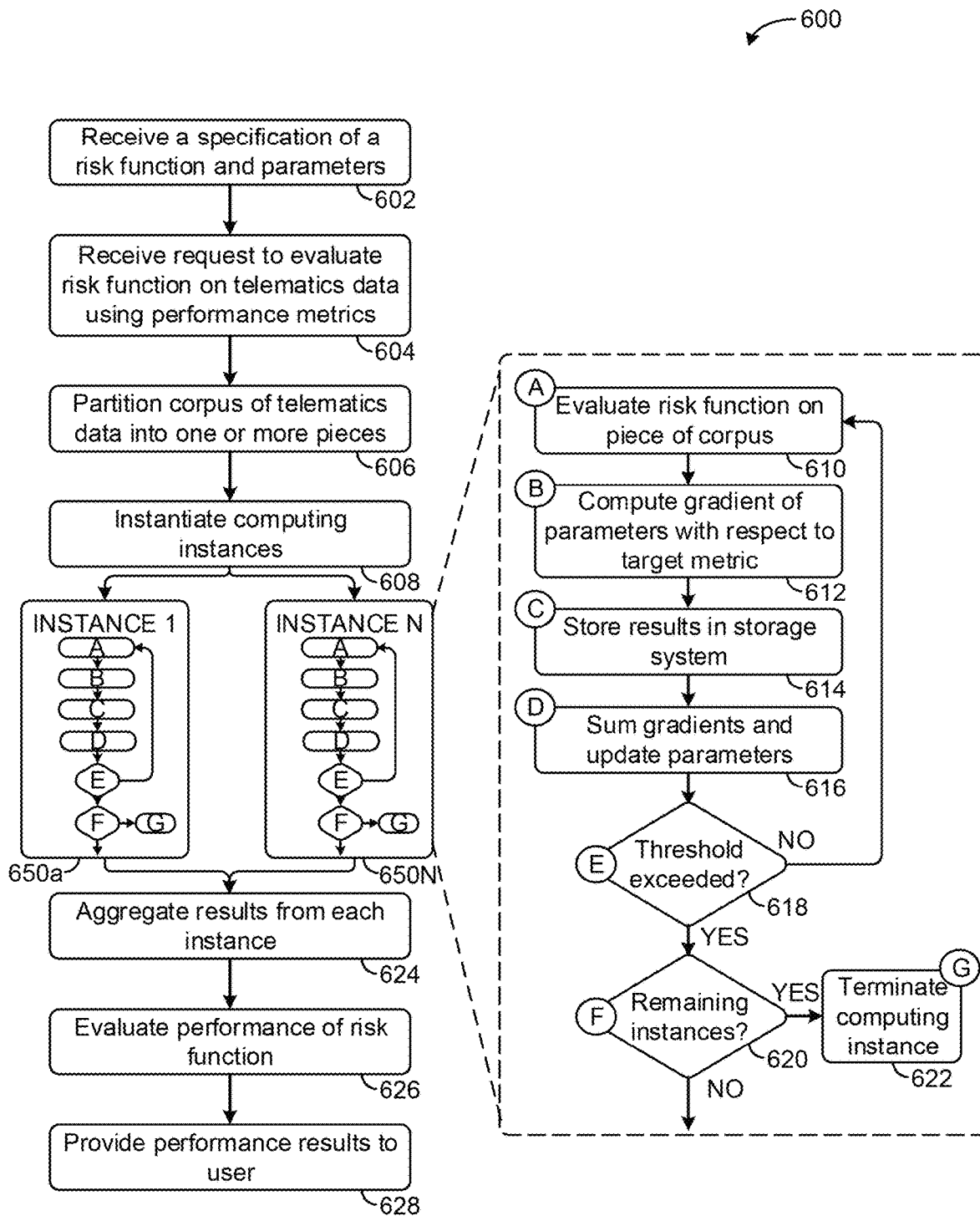

The process 500 is suitable for evaluating a single risk function. To optimize the parameters for a risk function, a process 600 shown in FIG. 6 can be used. In some examples, the process 600 is carried out by the model generator 102 (among other components of the system 100, such as the storage system 104 and/or the client device 106). In some examples, the process 600 is carried out by a computing environment (such as the computing environment 450) alone or in combination with the model generator 102.

Operations of the process 600 include receiving 602 a specification of a risk function and a set of parameters for optimization. For example, the risk function can be a piece of software that counts the total number of seconds that the vehicle's speed exceeds X miles per hour, where X is a parameter. In some examples, the set of parameters specified for the risk function can have initial values. At 604, a request to evaluate the risk function on a specified corpus of telematics data to produce an enumerated set of performance metrics is received. In some examples, the performance metrics include lift, AUC, or a Gini index (e.g., a measure of statistical dispersion), or combinations of them, among others.

The corpus of telematics data is partitioned 606 into one or more pieces. One or more computing instances 650*a*, . . . , 650N (e.g., virtual machines) are instantiated 608, and each instance is passed the risk function and its parameters, performance metrics, and its piece of the corpus. At 610, each computing instance evaluates the risk function using the initial parameter values on all of the telematics data in its piece of the corpus (or all of the trips in its piece of the corpus). Each instance also computes 612 a gradient of the parameters with respect to a target metric using, for example, automatic differentiation. In this context, the target metric is a function of the risk points and the claim status of the piece of telematics data or trip (e.g., did the driver generate a claim?). In some examples, the parameters can be updated before all the gradients are computed. At 614, the instance stores the results of the evaluation (e.g., the risk points) in a storage system, such as the storage system 104 or another storage system (e.g., a cloud database, cloud storage, network attached storage, etc.). In some examples, the instance also stores the gradient of the parameters computed at 612.

At 616, the instance sums the gradients and updates the parameters. Next, the instance determines 618 whether a time, step, and/or quality threshold has been exceeded. If not, the instance returns to 610 and repeats 610 through 618 with the updated parameters. On the other hand, if one or more of the thresholds has been exceeded (e.g., because the instance has completed stepping through the parameters, has exceeded its allotted processing time, or no longer satisfies a quality threshold), the instance proceeds to 620 where it determines whether there are any remaining instances that are still evaluating the risk function. If at least one instance remains, then the instance terminates 622 itself to reduce consumption of computing resources and minimize cost. If there are no remaining instances (e.g., the instance is the last instance), then the instance aggregates 624 the risk points stored in the storage system for each instance and evaluates 626 the performance of the risk function by deriving the specified performance metrics from the aggregated results. In some examples, the risk points are aggregated and the function's performance is evaluated by another processor separate from the instances. At 628, the performance metrics are provided to the user (e.g., through a GUI displayed on the client device 106).

In some examples, the corpora used for feature learning and model construction and evaluation can be improved to increase the performance and efficiency of the techniques described here. The classic data corpus includes all the trips taken by a population of drivers, along with their future claims history. For example, the data corpus can include all of the trips the population of drivers take during a six month period, and the number or cost of claims they generated over the subsequent six months can be predicted. In processes 500 and 600 shown in FIGS. 5 and 6, a risk for each trip is produced, and these individual risk points are aggregated (e.g., by summation) to produce an aggregate risk score for each driver.

However, there are some alternate methods of constructing corpora. First, insurance claims are rare, so a disproportionate amount of time is spent analyzing "safe" drivers (e.g., drivers without claims). Instead, the set of drivers can be resampled so that those with claims and without claims are nearly or exactly equal. By doing so, in some real world data sets, the size of the data corpus can be reduced by about 100 times, which reduces the time and computing resources necessary to carry out operations of the data. Also, in some examples, building a model on balanced data can improve model performance.

Alternately, telematics collisions and claims can be combined to determine the exact trip that generated a claim. When evaluating environmental factors that directly produce risk (e.g., unsafe weather), the data can produce a model that is substantially more predictive. Additionally, it can reduce the data size relative to the original data corpus by 10,000 times. Note that if the system is used twice, a feature can be developed using a proxy target and then validated using claims.

As discussed above, the data samples between drivers with and without claims can be balanced to reduce the size of the data corpus and the time spend analyzing "safe" drivers. However, this resampling induces a bias in the performance metrics. To produce unbiased results appropriate to the original problem, the performance metrics should be untilted. For example, if a fraction A of safe drivers and fraction B of risky drivers are sampled (with a typical distribution of A<<B), then when performance measurements are made (e.g., by creating a lift chart), each safe driver can be assigned a weight 1/A and each risky driver can be assigned weight 1/B. Similarly, a weight can also be applied to normalize exposure in situations where drivers have varying exposures.

Reproducible Data Pipelines:

A data pipeline for building a predictive model involves collecting different types of data from different sources. For example, the input to such a pipeline can include files of claims data (e.g., claim counts or claim costs) along with exposure periods for insurance policies; telematics data for trips from the drivers during these periods, such as risk points, mileage, and driving date; data linking driver IDs to corresponding insurance policies; among other data. Each of these data may occur in multiple forms. For example, claims may be combined from multiple different insurance providers, each with a separate file format and data schema.

These files need to be cleaned, converted into a common schema, joined, and risk across trips needs to be aggregated into risk per driver per scoring period. Risk may also be aggregated in other ways, such as by vehicle and scoring period or insurance policy and scoring period. The output of the data pipeline is a design matrix. The rows correspond to driver periods (e.g., a single driver for a fixed amount of time), and the columns correspond to observed features (e.g., amount of time speeding or number of harsh braking events), target variables (e.g., claim count, claim cost, or a proxy target), exposure (e.g., number of days insured or number of days of data collection). There may be multiple design matrices produced corresponding to test versus training data or different populations of drivers.

While developing a risk model, new data sources will appear and need to be integrated in to the data pipeline. Moreover, infelicities in the initial data processing are typically will be uncovered, requiring the addition of extra filtering and data cleaning steps throughout the process.

As the risk model is developed, the intermediate data and the final design matrix will typically change. When an actuarial team has completed development of the risk model, they build a model using the current best design matrix. In the United States, a document describing that model is filed with the Department of Insurance (DOI) in each state in which an insurer wishes to use the model.

To address questions from DOIs and to address any potential legal inquiries, it is imperative that the data used in building the model remain available. It is not impossible for a DOI to ask a question a year or more after submission that requires analysis of the underlying data.

Because of the complex and dynamic nature of the data pipeline, and because further development will typically continue after the model submission (e.g., in support of some future generation of risk models), it is possible for actuaries to lose track of the particular version of the data they used for a particular filing. Also, if a model is trained on a particular design matrix, but there are many design matrices produced, there may be no natural way to associate a particular design matrix with the data that generated it. Finally, because the files are very large and the processing time can take many hours, analysts are discouraged from archiving clean, labeled copies of their data.

In such situations, it can become impossible to find or reproduce the exact data used for building a particular model. In the worst case, a model may be rendered unusable for regulatory purposes because the specific data used cannot be recovered, which can nullify years of actuarial effort.

Figure 7:
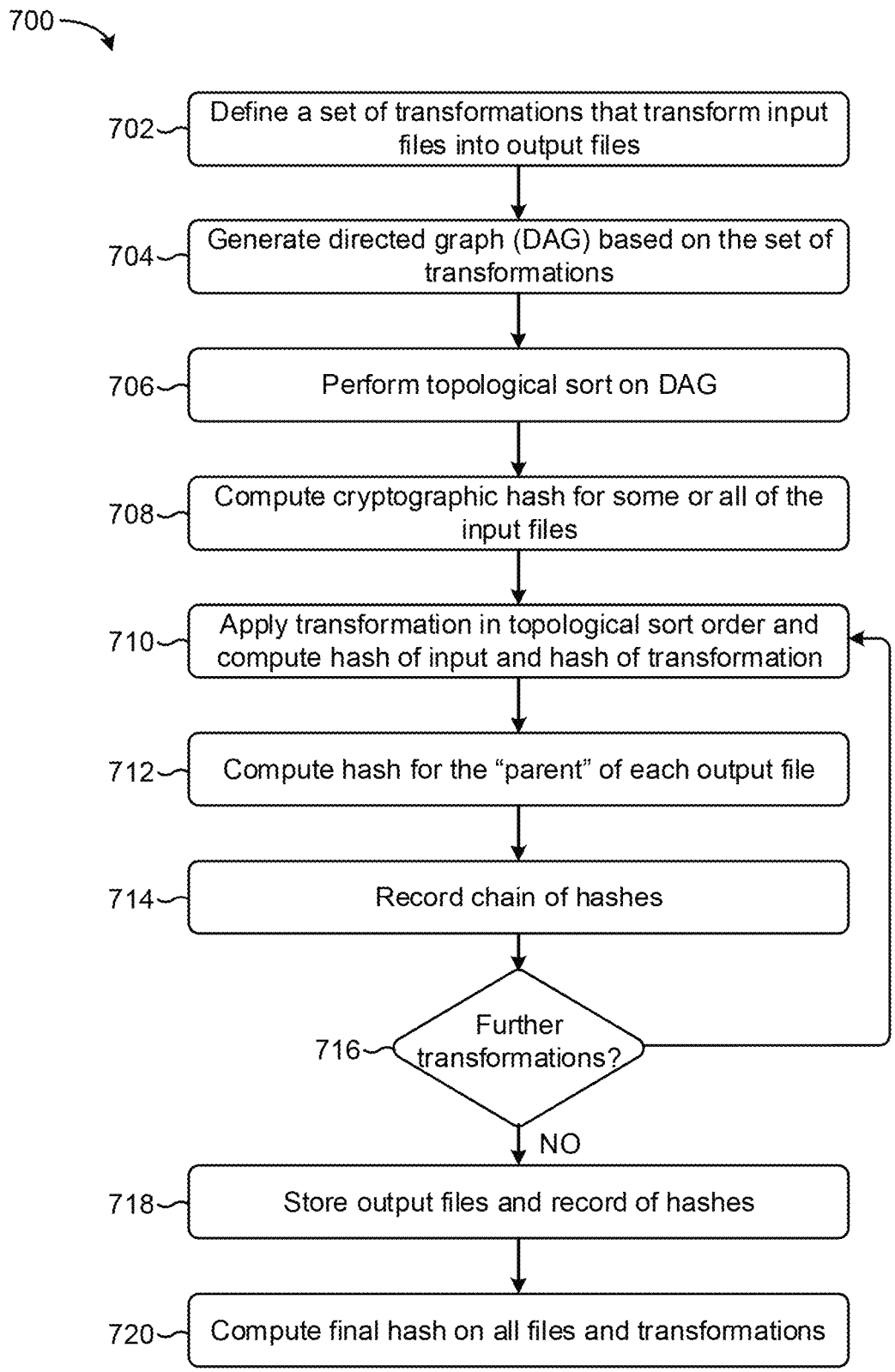
FIG. 7 illustrates an example process for generating a reproducible data pipeline.

FIG. 7 illustrates an example process 700 for generating a reproducible data pipeline. In some examples, the process 700 is carried out by the model generator 102 (among other components of the system 100, such as the storage system 104 and/or the client device 106).

Figure 8:
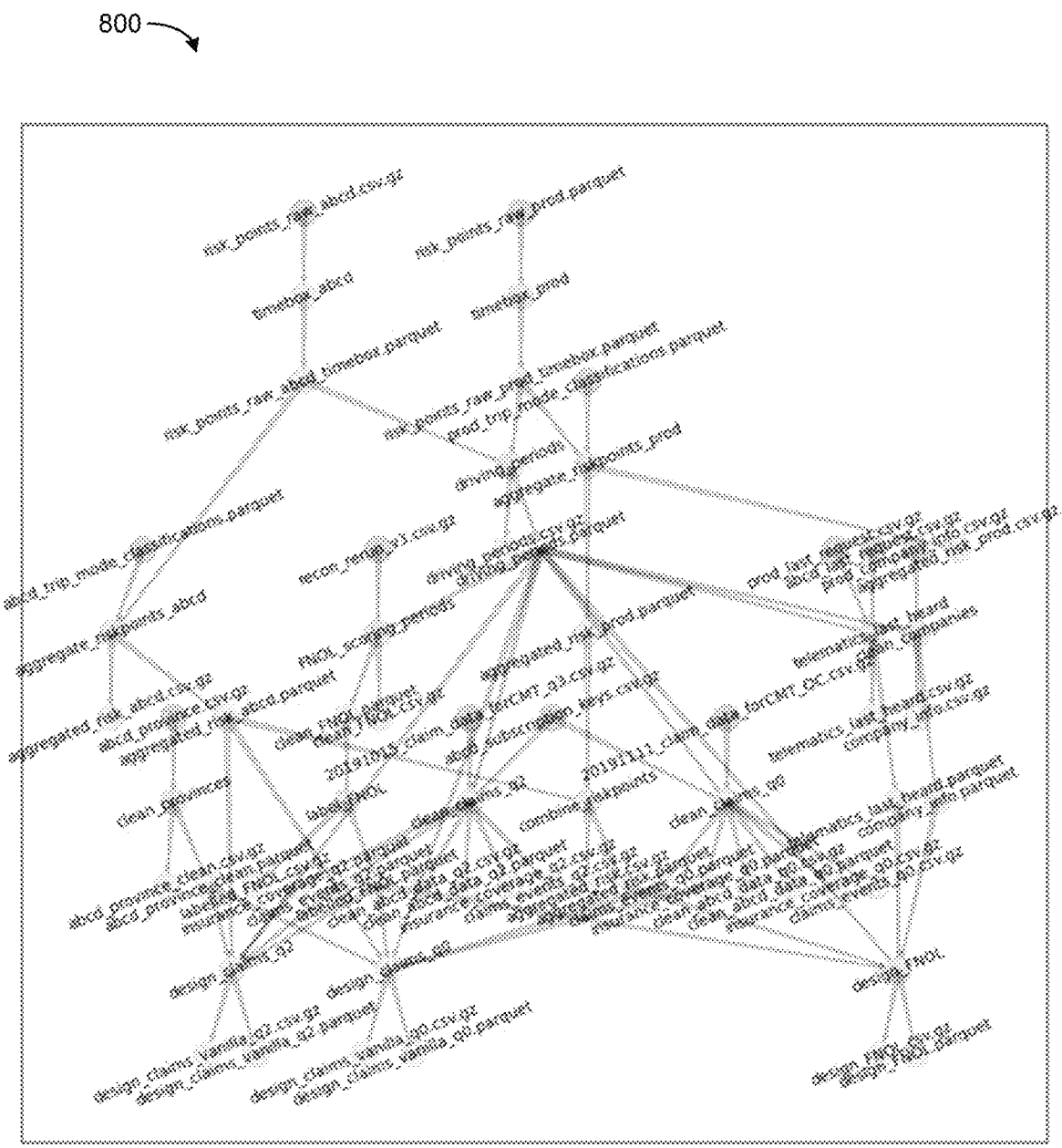
FIG. 8 illustrates an example directed acyclic graph (DAG).

Operations of the process 700 include defining 702 a set of transformations in software that transform a set of input files into a set of output files. Based on the set of transformations, a directed graph describing the relationships between all of the input, intermediate, and output files is generated 704. In some examples, the directed graph is automatically analyzed to ensure that it forms a directed acyclic graph (DAG) (e.g., a directed graph with no cycles). An example DAG 800 is shown in FIG. 8. At 706, a topological sort is performed on the DAG to produce a consistent order in which to apply the transformations that respects their input-to-output relationships.

Cryptographic hashes are computed 708 for all of the input files. For example, a set of input files stored in a cloud storage environment are identified and copied to a particular location, and cryptographic hashes are computed for those files. The cryptographic hashes distinguish different files with a very high probability. For example, a SHA-256 hash may be used, in which case the probability of failing to distinguish two different random files is less than $10^{-77}$. At 710, each transformation is applied in the order specified by the topological sort, with a hash of the input functions and a hash of the code specifying the transformation being computed for each transformation. These transformations are canonically sorted and hashed again to produce 712 a hash for the "parent" of each output file. The output files themselves may become the inputs to downstream transformations, and the chain of hashes is tracked 714. At 716, it is determined whether there are further transformations to be applied. If there are further transformations, the process 700 repeats operations 710 through 716 until all transformations have been applied in the correct order. Once all of the transformations have been applied, the full set of outputs and the record of the cryptographic hashes of each file are stored 718 in a storage system (e.g., the storage system 104 or another storage system, such as a cloud storage system). In some examples, the record is stored both in a log file and in metadata associated with each file itself. At 720, a final cryptographic hash of all files and transformations is computed to provide a single signature of the entire data pipeline.

On subsequent runs, the model generator 102 can attempt to analyze the changes to the data pipeline to reduce the number of cryptographic hashes that need to be recomputed. For example, before a transformation is applied, the hashes of the input files and transformation are recomputed. The "parent" hash of each output file is examined, and if that hash is unchanged, then the transformation can be skipped without changing the output.

In some examples, the output location for the outputs and the record of the cryptographic hashes is configurable. By doing so, multiple different data sets and data pipelines can coexist without interfering with each other. In some examples, the output of the process 700 can be fed into the bootstrap process described herein. By tracking the output location and final cryptographic hash, an audit trail describing which data was used is automatically generated. When a risk model is ready to be filed, the output directory can be frozen (e.g., the data is no longer allowed to be modified or added to).

Because the input files are copied into the output directory, it is possible to reproduce the entire data pipeline. Moreover, by automated comparison of hashes, it is possible to examine the output directory automatically and guarantee (with extremely high probability, e.g., ignoring cryptographic hash collisions) that nothing has changed.

The process 700 describes a topological sort for applying the transformations (e.g., the order of the transformations is serialized in a manner that respects the DAG). However, it is possible to automatically examine the DAG and deduce transformations that can safely be performed in parallel. The simplest method would be to perform all transformations in each layer of the DAG simultaneously, but further optimizations are possible. This parallelization performs a logically and functionally equivalent operation to the serial version, but can reduce processing time. Moreover, it may be difficult for an actuary to determine an efficient parallelized schedule for applying transformations, at which point this system would outperform even an optimal human-administered data pipeline.

Figure 9:
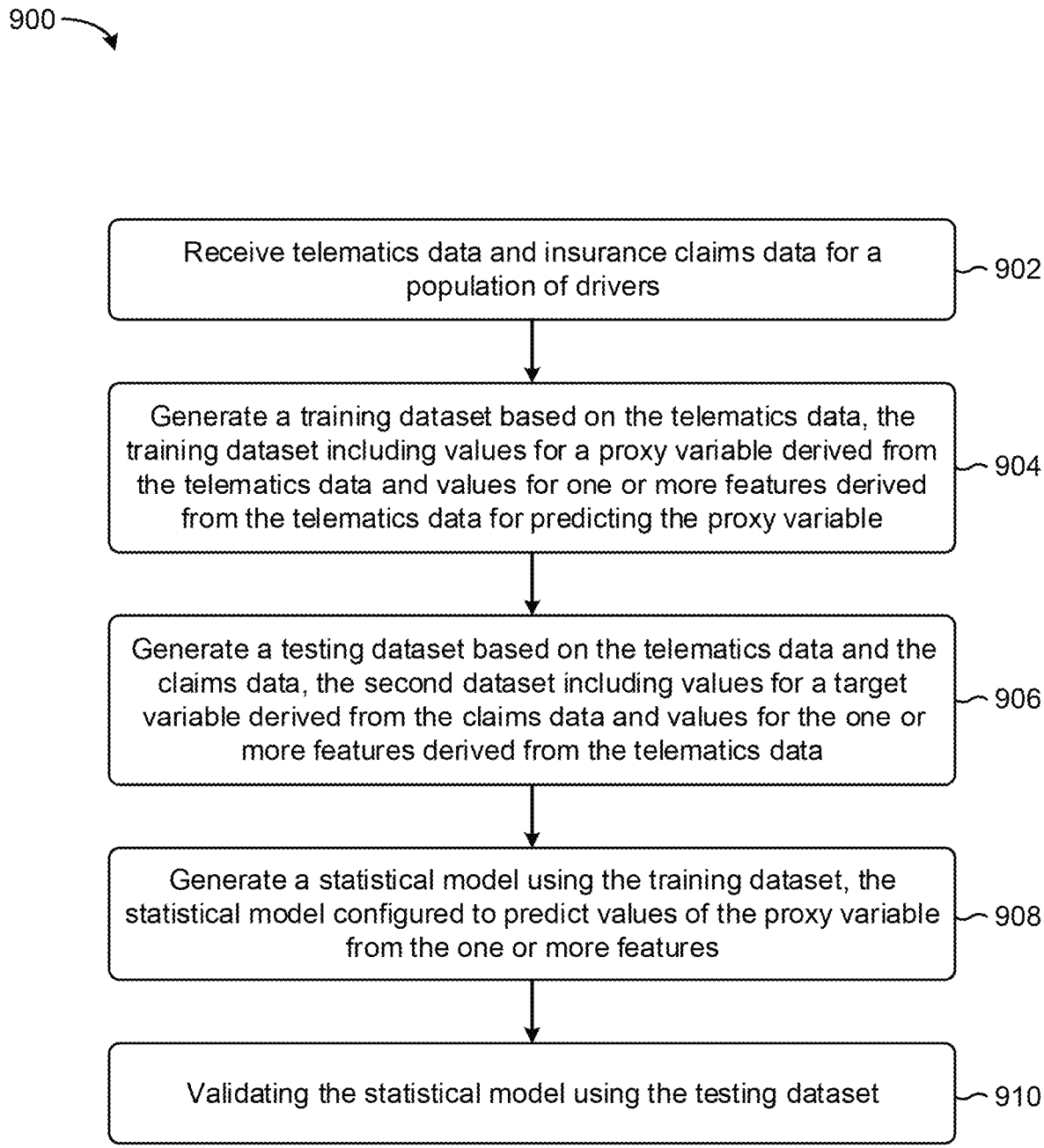
FIG. 9 illustrates an example processes for constructing an evaluating a statistical model.

FIG. 9 illustrates a flowchart of an example process 900 for constructing and evaluating a statistical model. In some examples, the electronic device(s), system(s), or component(s), or portions or implementations thereof, of FIGS. 1-8 are configured to perform the process 900, such as the model generator 102.

Operations of the process 900 include receiving 902 telematics data and insurance claims data for a population of drivers. In some examples, at least a portion of the telematics data is captured by a telematics device or mobile device disposed in a vehicle of a driver in the population of drivers. In some examples, other data, such as demographic information about a driver or policy owner, is received.

A training dataset for training a statistical model is generated 904 based on the telematics data. The training dataset can include values for a proxy variable derived from the telematics data, and values for one or more features derived from the telematics data for predicting the proxy variable. In some examples, the proxy variable includes telematics collisions, hard braking, hard acceleration, phone distraction, speeding, or combinations of them, among others.

A testing dataset for validating the statistical model is generated 906 based on the telematics data and the claims data. The testing dataset can include values for a target variable derived from the claims data, and values for the one or more features derived from the telematics data. In some examples, values for the target variable included in the testing dataset include a number of insurance claims for a particular exposure period or a cost of insurance claims for a particular exposure period, or both.

The statistical model is generated 908 using the training dataset. For example, regression analysis can be applied on the training dataset to fit the statistical model to the training dataset. In this manner, the statistical model is configured to predict values of the proxy variable from values of the one or more features.

After generating the statistical model, the model is validated 910 using the testing dataset. In some examples, validating the statistical model using the testing dataset includes: applying the values for the one or more features included in the testing dataset to the statistical model to determine values for the proxy variable for each driver in the population of drivers; determining a distribution of the values for the proxy variable for each driver in the population of drivers; and mapping the values for the target variable in the second dataset to the distribution. In some examples, validating the statistical model using the testing dataset includes generating a lift chart, computing a lift statistic, or computing an area ROC curve (e.g., AUC), or combinations of them, among other model performance metrics. Each of these statistics can be displayed to a user (e.g., analyst) in, for example, a graphical user interface.

Figure 10:
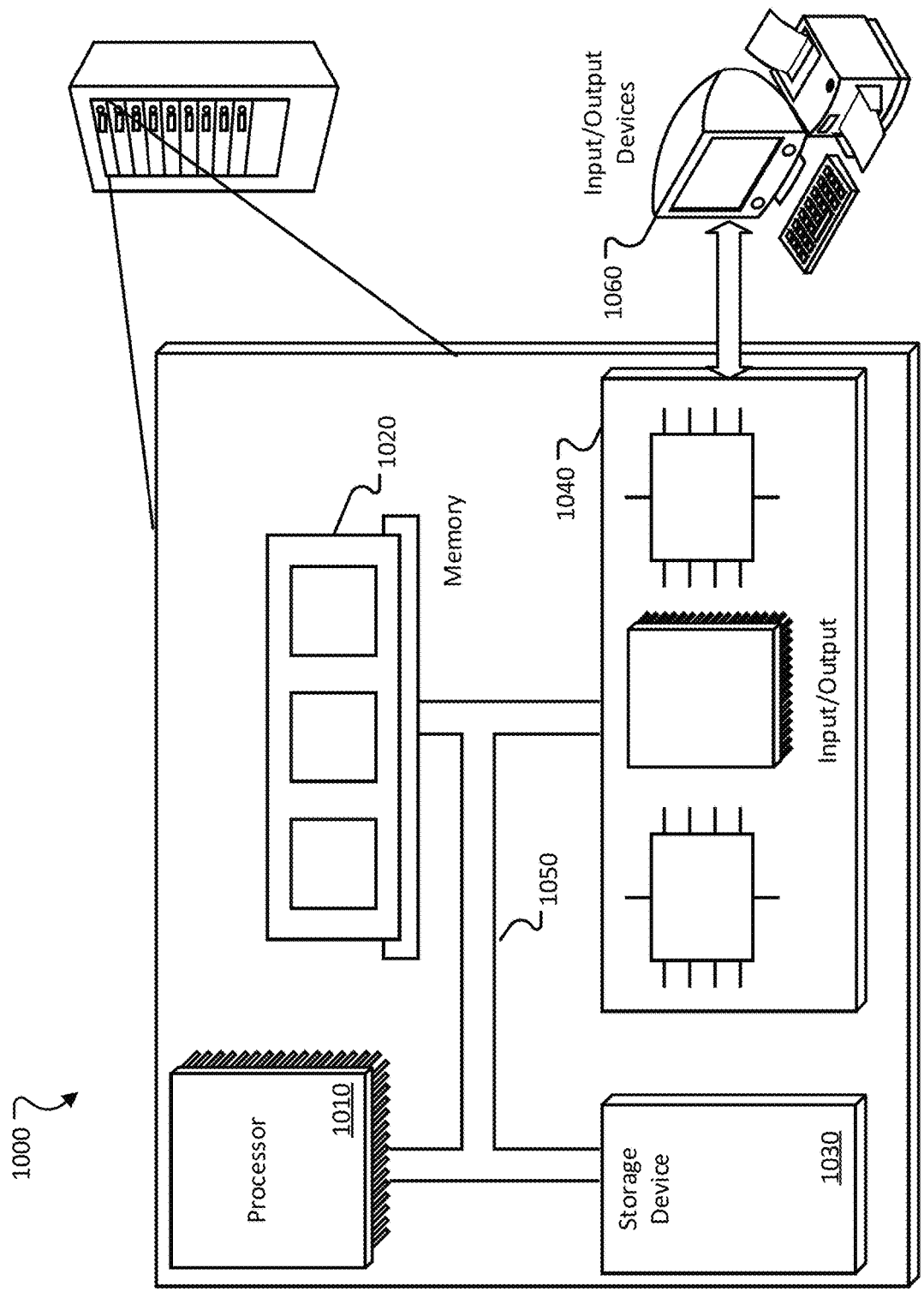
FIG. 10 illustrates an example computer system.

FIG. 10 is a block diagram of an example computer system 1000. For example, referring to FIG. 1, the model generator 102 could be an example of the system 1000 described here, as could a computer system used by any of the users who access resources of these components (e.g., the client device 106). The system 1000 includes a processor 1010, a memory 1020, a storage device 1030, and one or more input/output interface devices 1040. Each of the components 1010, 1020, 1030, and 1040 can be interconnected, for example, using a system bus 1050.

The processor 1010 is capable of processing instructions for execution within the system 1000. The term "execution" as used here refers to a technique in which program code causes a processor to carry out one or more processor instructions. In some implementations, the processor 1010 is a single-threaded processor. In some implementations, the processor 1010 is a multi-threaded processor. The processor 1010 is capable of processing instructions stored in the memory 1020 or on the storage device 1030. The processor 1010 may execute operations such as those described with reference to FIGS. 4-7 and 9.

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a non-transitory computer-readable medium. In various different implementations, the storage device 1030 can include, for example, a hard disk device, an optical disk device, a solid-state drive, a flash drive, magnetic tape, or some other large capacity storage device. In some implementations, the storage device 1030 may be a cloud storage device, e.g., a logical storage device including one or more physical storage devices distributed on a network and accessed using a network. In some examples, the storage device may store long-term data. The input/output interface devices 1040 provide input/output operations for the system 1000. In some implementations, the input/output interface devices 1040 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 1000 to communicate, for example, transmit and receive data. In some implementations, the input/output device can include driver devices configured to receive input data and send output data to other input/output devices, e.g., keyboard, printer and display devices 1060. In some implementations, mobile computing devices, mobile communication devices, and other devices can be used.

A server, such as the servers shown in FIG. 1, can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 1000 is contained within a single integrated circuit package. A system 1000 of this kind, in which both a processor 1010 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1040.

Although an example processing system has been described in FIG. 10, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or MS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method, comprising:
receiving, by at least one processor, telematics data and insurance claims data for a population of drivers;
generating, by the at least one processor, a training dataset based on the telematics data, the training dataset including:
values for a proxy variable derived from the telematics data, and
values for one or more features derived from the telematics data for predicting the proxy variable;
generating, by the at least one processor, a testing dataset based on the telematics data and the claims data, the testing dataset including:
values for a target variable derived from the claims data, and
values for the one or more features derived from the telematics data;
generating, by the at least one processor, a statistical model using the training dataset, the statistical model configured to predict values of the proxy variable from values of the one or more features; and
validating, by the at least one processor, the statistical model using the testing dataset.

2. The method of claim 1, wherein validating the statistical model using the testing dataset comprises:
applying the values for the one or more features included in the testing dataset to the statistical model to determine values for the proxy variable for each driver in the population of drivers;
determining a distribution of the values for the proxy variable for each driver in the population of drivers; and
mapping the values for the target variable in the second dataset to the distribution.

3. The method of claim 1, wherein validating the statistical model using the testing dataset comprises generating a lift chart, computing a lift statistic, or computing an area under a receiver operator characteristic (ROC) curve.

4. The method of claim 1, wherein the values for the target variable included in the testing dataset comprise a number of insurance claims for a particular exposure period or a cost of insurance claims for a particular exposure period.

5. The method of claim 1, wherein the method is carried out in a first computing instance, the method further comprising, in a second computing instance:
resampling the training dataset with replacement to produce a resampled training dataset, the resampled training dataset including values for the proxy variable and values for the one or more features;
resampling the testing dataset with replacement to produce a resampled testing dataset, the resampled testing dataset including values for the target variable and values for the one or more features;
generating a second statistical model using the resampled training dataset; and
evaluating the second statistical model using the resampled testing dataset, including:
comparing an output of the second statistical model with an output of the first statistical model; and
determining a confidence interval for the output of the first statistical model based at least in part on the comparison.

6. A computer-implemented method, comprising:
receiving, by at least one processor, one or more parameters for a computational experiment, the one or more parameters including one or more features and one or more datasets for generating a statistical model;
generating, by the at least one processor, one or more sub-experiments based on the computational experiment, each sub-experiment including an indication of a particular set of the one or more parameters to be applied in the sub-experiment;
generating, by the at least one processor, a queue with each of the one or more sub-experiments;
generating, by the at least one processor, one or more computing instances configured to:
receive a sub-experiment from the queue;
generate a training dataset and a testing dataset by resampling the one or more datasets with replacement;
generate the statistical model with the training dataset;
validate the statistical model with the testing dataset;
store one or more outputs of the validation in a storage system;
aggregating the one or more outputs of the validation stored in the storage system to produce an aggregated output for the computational experiment; and
processing the aggregated output to generate one or more performance metrics for the statistical model.

7. The method of claim 6, wherein the one or more parameters include a specification of features from the one or more features used for prediction, a specification of a target variable from the one or more features, a specification of a proxy variable from the one or more features, or a type of model for generating the statistical model.

8. The method of claim 6, wherein each instance includes multiple processing pipelines, and wherein each instance receives a sub-experiment for each available pipeline of the multiple processing pipelines.

9. The method of claim 6, wherein each of the one or more computing instances is configured to:
   determine whether there are any remaining sub-experiments in the queue; and
   terminate in response to a determination that there are no remaining sub-experiments in the queue.

10. The method of claim 6, further comprising processing the aggregated output to generate a confidence interval for at least one of the one or more performance metrics.

\* \* \* \* \*